United States Patent Office 3,005,008
Patented Oct. 17, 1961

3,005,008
DERIVATIVES OF DIHYDROCARBYLOXYPHOSPHINYL THIOFORMIC ACIDS AND PREPARATION OF THE SAME
Daniel W. Grisley, Jr., and Gail H. Birum, Dayton, Ohio, and Samuel Allen Heininger, Warson Woods, Mo., assignors to Monsanto Chemical Company, St. Louis, Mo., a corporation of Delaware
No Drawing. Filed Aug. 10, 1959, Ser. No. 832,424
17 Claims. (Cl. 260—461)

This invention relates to organic phosphorus compounds containing sulfur. In one aspect, this invention relates to organic phosphorus compounds which contain a sulfur atom linked to the carbon atom of a phosphinyl group. In another aspect, this invention relates to alkali metal dihydrocarbyloxyphosphinyl thioformates wherein an alkali metal atom is directly linked to the sulfur atom of the dihydrocarbyloxyphosphinyl thioformic acid group. In another aspect, this invention relates to S-alkyl-dihydrocarbyloxyphosphinyl thioformates wherein said alkyl radical is directly linked to the sulfur atom of a dihydrocarbyloxyphosphinyl thioformic acid group. In another aspect, this invention relates to methods for preparing alkali metal and alkyl derivatives of dihydrocarbyloxyphosphinyl thioformic acids.

Numerous organic compounds containing both sulfur and phosphorus atoms are known to exist and to have considerable commercial value in a great variety of useful applications. Although many sulfur-containing phosphorus compounds are derived from the phosphonic acid group, these compounds are usually characterized by the attachment of the sulfur atom directly to the phosphorus atom by a P—S bond. It is desirable to form other sulfur-containing organic phosphorus compounds having various functional groups, such as the carbonyl group, incorporated therein since such compounds would probably have new uses and applications.

We have discovered that carbonyl sulfide can be used as a reactant to form organic compounds of sulfur and phosphorus having a phosphinyl phosphorus atom separated from a sulfur atom by a carbonyl group.

An object of this invention is to provide new organic phosphorus compounds wherein a sulfur atom is linked directly to the carbon atom of the carbonyl group which is linked directly to a phosphinyl phosphorus atom.

Another object of this invention is to provide alkali metal dihydrocarbyloxyphosphinyl thioformates as new compounds.

Another object of this invention is to provide S-alkyl dihydrocarbyloxyphosphinyl thioformates as new compounds.

Another object of this invention is to provide methods for producing derivatives of dihydrocarbyloxyphosphinyl thioformic acids.

Other aspects, objects and advantages of the invention are apparent from a consideration of the accompanying disclosure and the appended claims.

According to the present invention, alkali metal salts of hydrocarbylphosphite diesters are reacted with carbonyl sulfide to form alkali metal salts of dihydrocarbyloxyphosphinyl thioformic acids as new compounds, according to the reaction which proceeds substantially as follows:

(I) 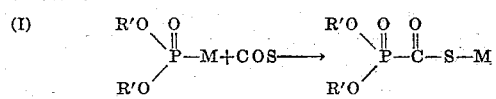

wherein R′ is a hydrocarbyl radical containing from 1 to 12 carbon atoms and selected from the group consisting of alkyl, aryl, alkaryl, and aralkyl radicals and M is an alkali metal selected from the group consisting of sodium, potassium and lithium. The expression "hydrocarbyl" as used herein and in the appended claims refers to the radical obtained by the removal of a hydrogen atom from any hydrocarbon.

Further, according to the present invention, alkali metal salts of dihydrocarbyloxyphosphinyl thioformic acids are reacted with a compound of the formula R″Y wherein R″ is an alkyl radical of from 1 to 8 carbons atoms and Y is an easily replaceable group such as a sulfate, sulfonate, or halide group, according to the reaction which proceeds substantially as follows:

(II) 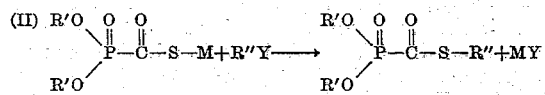

wherein R′, R″ and M are as above defined and Y is an easily replaceable group selected from the group consisting of

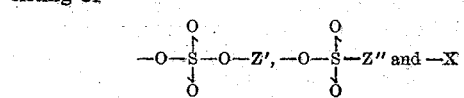

wherein Z′ is an alkyl radical of from 1 to 8 carbon atoms, Z″ is a radical selected from the group consisting of alkyl, aryl, alkaryl, aralkyl, haloalkyl, and haloaryl radicals containing from 1 to 12 carbon atoms and X is a halogen selected from the group consisting of bromine, chlorine and iodine.

Further, according to the present invention, there are provided, as new compounds, alkali metal and alkyl derivatives of dihydrocarbyloxyphosphinyl thioformic acids of the formula:

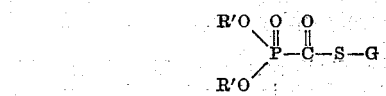

wherein R′ is as above defined and G is selected from the group consisting of sodium, potassium, lithium and alkyl, said alkyl containing from 1 to 8 carbon atoms.

The alkali metal phosphite diester reactants employed in Reaction I can be any sodium, potassium or lithium salts of a hydrocarbylphosphite diester wherein said hydrocarbyl radical is substantially free of acetylenic unsaturation and which contains from 1 to 12 carbon atoms. Suitable hydrocarbyl radicals include the alkyl, aryl, alkaryl, and aralkyl radicals. Examples of suitable phosphite diesters include the sodium, potassium and lithium, dimethyl, di(n-butyl), diethyl, bis(tert-amyl), bis(2-ethylhexyl), diphenyl, dibenzyl, ditolyl, bis(alpha or beta-naphthyl), bis(4-biphenyl), bis(para-ethylphenyl), and bis(2-phenylethyl)phosphites.

The alkali metal hydrocarbylphosphite diester reactants may be produced by various procedures known in the art. Preferably, these reactants are prepared by reacting hydrocarbyl hydrogen phosphite dissolved in a solvent such as benzene with sodium hydride suspended in diethyl ether. However, this invention is not limited by the method by which the alkali metal salt of the hydrocarbylphosphite diester is prepared.

Illustrative examples of the alkali metal salts of dihydrocarbyloxyphosphinyl thioformic acid obtained as a product in Reaction I are as follows: sodium, potassium or lithium diethoxyphosphinyl thioformate; sodium, potassium or lithium dimethoxyphosphinyl thioformate; sodium, potassium or lithium dioctoxyphosphinyl thioformate; sodium, potassium or lithium dibutoxyphosphinyl thioformate; sodium, potassium or lithium diphenoxyphosphinyl thioformate; and sodium, potassium or lithium dibenzyloxyphosphinyl thioformate.

The compound of the formula R″Y reacted with the alkali metal dihydrocarbyloxyphosphinyl thioformate in Equation II is a compound wherein Y is an easily replaceable group, such as sulfate, sulfonate, or halide group, and R″ is an alkyl radical of from 1 to 8 carbon atoms. Thus, Y can be a sulfate of the formula

a sulfonate of the formula

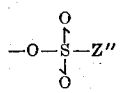

or a halide of formula —X. R″ in the above formulas can be methyl, ethyl, propyl, n-butyl, n-hexyl, or the like. Z′ in the above sulfate formula can be the same or different from the R″, but Z′ is preferably the same as R″ so that the sulfate is dimethyl sulfate, diethyl sulfate, or the like. Z″ in the above sulfonate formula can be either an alkyl or an aryl group, including halo and alkyl substituted derivatives of the alkyl and the aryl sulfonates. Illustrative examples of suitable sulfonate reactants include methyl benzenesulfonate, ethyl benzenesulfonate, methyl chlorobenzenesulfonate, methyl bromobenzenesulfonate, methyl toluenesulfonate, methyl ethylbenzenesulfonate, methyl xylenesulfonate, methyl ethanesulfonate, methyl 2-chloroethanesulfonate, and the like. The halide reactant in the above formula can be either alkyl bromide, alkyl iodide, or alkyl chloride, and preferably the halide is methyl iodide.

Illustrative examples of the S-alkyl dihydrocarbyloxyphosphinyl thioformates formed as a product in Reaction II are: S-methyl diethoxyphosphinyl thioformate, S-ethyl diethoxyphosphinyl thioformate, S-methyl dimethoxyphosphinyl thioformate, S-propyl dibutoxyphosphinyl thioformate, S-methyl diphenoxyphosphinyl thioformate, S-methyl dibenzyloxyphosphinyl thioformate and the like.

The reaction of the alkali metal phosphite diester with the carbonyl sulfide set forth in Reaction I is very exothermic and the alkali metal phosphinyl thioformate product produced is relatively unstable at elevated temperature so that this reaction is normally conducted at low temperatures. In general, a temperature within the range of from —100° C. to +150° C. is used and preferably the temperature is within the range of —80° C. to +25° C. The use of temperatures in the upper portion of the broad temperature range given normally requires the use of elevated pressure to prevent decomposition of the product. However, elevated pressures are not ordinarily required and the reaction can be carried out at subatmospheric and atmospheric as well as superatmospheric pressures. Usually, the reaction is carried out using an inert solvent, such as tetrahydrofuran, benzene, toluene, diethyl ether, dioxane, hexane, diethylcarbitol and the like. The solvent used should be one in which the alkali metal phosphite diester is soluble at the reaction temperature and which has a low freezing point or at least does not freeze at the reaction temperature selected. The selection of the particular solvent also depends upon whether the alkali metal phosphinyl thioformate product is to be separated and recovered as product of the process or is to be further reacted with the compound of the formula R″Y as shown in Reaction II. If Reaction II is to be carried out, it is preferred that a solvent such as tetrahydrofurfuran in which the alkali metal phosphinyl thioformate product of Reaction I is soluble be used; however, if the alkali metal phosphinyl thioformate product is to be recovered from Reaction I, it is preferred that diethyl ether in which the product of Reaction I is insoluble be employed as the solvent for ease of separation.

Reaction I is preferably carried out by bubbling the gaseous carbonyl sulfide into the solvent solution of alkali metal phosphite diester for a period of time until the exothermic heat of reaction ceases. However, the reaction can also be conducted at a temperature below —50° C., the boiling point of carbonyl sulfide, with liquid carbonyl sulfide and in this method of conducting the reaction, the alkali metal phosphite diester solution is preferably added slowly to the liquid carbonyl sulfide solution. Thus, the reaction of Equation I can be carried out with either the carbonyl sulfide or the alkali metal phosphite diester in stoichiometric excess; however, preferably stoichiometric amounts are used.

The reaction of the alkali metal phosphinyl thioformate product obtained in Reaction I with the compound of the formula R″Y, as set forth in Equation II, to produce the S-alkyl dihydrocarbyloxyphosphinyl thioformate is usually carried out at temperatures somewhat above the temperatures employed in Reaction I. Ordinarily, a temperature within the range of from —30° C. to +50° C. is used and preferably a temperature in the range of from 0 to 15° C. Temperatures in the lower portion of the temperature range specified are not particularly desirable since the reaction rate is rather slow and temperatures in the upper portion of the temperature range specified are not normally chosen because various side reactions sometimes occur. It will be noted that under some conditions of temperature, Reactions I and II can be carried out at the same temperature. As in Reaction I, the pressure can be either subatmospheric, atmospheric, or superatmospheric. Also, since the reaction is somewhat exothermic in nature, it is desirable to conduct the reaction in the presence of an inert solvent. Preferably, the solvent is one in which the alkali metal phosphinyl thioformate produced in Reaction I is soluble, such as tetrahydrofuran, but any other solvent specified for use in Reaction I can be used. Preferably, stoichiometric amounts of the reactants are employed but an excess of either reactant can be used if desired.

The alkali metal dihydrocarbyloxyphosphinyl thioformate products of this invention are gummy solids which are light in color and insoluble in normal paraffins and diethyl ether and soluble in dioxane, diethyl carbitol and tetrahydrofuran. These compounds are relatively stable at low temperatures but decompose at temperatures substantially above room temperature. The S-alkyl dihydrocarbyloxyphosphinyl thioformates are relatively stable, colorless liquids. Each of these compounds shows some herbicidal activity. The alkali metal phosphinyl thioformates exhibit activity as soil fumigants whereas the S-alkyl phosphinyl thioformates exhibit activity as insecticides. These compounds can also be advantageously employed as plasticizers for many plastics and resins, as lubricant and lubricant additives, as corrosion inhibitors, as flame-proofing agents and the like.

The advantages, desirability and usefulness of the new compounds of this invention are illustrated by the following examples:

*Example 1*

Sodium diethoxyphosphinyl thioformate was prepared in this example by the reaction of sodium diethyl phosphite with carbonyl sulfide. The sodium diethyl phosphite was prepared by slowly adding a solution of 138 g. of diethyl hydrogen phosphite and 100 ml. of benzene to a stirred suspension of 47 g. of sodium hydride (as a 50.9 weight percent dispersion in mineral oil) in 300 ml. of diethyl ether at a temperature of 5° C. The temperature of the reaction mixture was maintained at 25° C. with ice cooling. The formation of the sodium diethyl phosphite was completed in approximately 30 minutes; however, the reaction mixture was warmed to 35° C. for an additional 15 minutes.

The diethyl ether solution of sodium diethyl phosphite obtained was then cooled to 5° C. and gaseous carbonyl sulfide was introduced while maintaining the temperature of the mixture between 5 and 25° C. The introduction of gaseous carbonyl sulfide was continued during a period of one hour until the rise in temperature due to the exothermic heat of reaction substantially stopped. The slightly yellow precipitate of sodium diethoxyphosphinyl thioformate was separated by evaporation of the solvent and purified by trituration with hot hexane. The purified material was dried at 0.1 mm. pressure for 22 hours. The infrared spectrum of the dried product had a peak at 6.3 microns which corresponds to the carbonyl group.

*Example 2*

In this example, S-methyl diethoxyphosphinyl thioformate was prepared from the sodium diethoxyphosphinyl thioformate obtained in Example 1. This example serves not only to prove the structure of the sodium diethoxyphosphinyl thioformate obtained in Example 1 but also to produce the S-methyl derivative of this new compound.

In this example, the sticky precipitate of sodium diethoxyphosphinyl thioformate obtained after the addition of the carbonyl sulfide was dissolved by the addition of 100 ml. of dry tetrahydrofuran to form a clear brown solution. This solution was added to 126 g. of dimethyl sulfate over a period of 1 hour with the temperature maintained in the range of from 5 to 10° C. The reaction mixture obtained was extracted with 200 ml. portions of water and the organic phase obtained was dried with sodium sulfate, filtered and evaporated at 30 to 50° C. under 20 mm. pressure to yield a yellow oil in an amount of 186.8 g. This yellow oil was fractionally distilled to obtained 101.7 g. fraction boiling in the range of 110–120° C. under a pressure of 1.5 to 3 mm. This fraction was then redistilled to yield 83.3 g. of S-methyl diethoxyphosphinyl thioformate boiling in the range of 76.2 to 78.5° C. at a pressure of 0.2 mm. This compound had a refractive index of $n_D^{27}$ 1.4692 and an infrared spectrum corresponding to the proposed structure. The analysis of the S-methyl diethoxyphosphinyl thioformate was as follows:

|  | Found | Calculated for $C_6H_{13}O_4PS$ |
| --- | --- | --- |
| Percent Carbon | 34.24 | 33.96 |
| Percent Hydrogen | 5.98 | 6.17 |
| Percent Phosphorus | 14.92 | 14.60 |
| Percent Sulfur | 15.34 | 15.11 |

*Example 3*

In this example, S-methyl diethoxyphosphinyl thioformate was prepared by the addition of a solution of sodium diethylphosphite in tetrahydrofuran to an excess of liquid carbonyl sulfide maintained at a temperature of −80° C. in a dry atmosphere, followed by reaction with dimethyl sulfate. The reaction mixture was stirred and the rate of addition of the sodium diethylphosphite solution was regulated so that a negligible amount of gas escaped from the reaction mixture. After the addition of the sodium diethylphosphite solution was complete, the stirred reaction mixture was allowed to warm to room temperature over a one hour period as excess gas escaped. Dimethyl sulfate was then added to the reaction mixture at a temperature of 5 to 15° C. to form a precipitate which was removed by filtration. The filtrate yielded S-methyl diethoxyphosphinyl thioformate having a boiling point 124–126° C. at a pressure of 2.2 mm. and a refractive index of $n_D^{26}$ 1.4683.

Sodium diethoxyphosphinyl thioformate inhibits the growth of damping-off fungi *Phymatotrichum sp., Rhizoctonia solani, Sclerotium rolfsii, Fusarium lycopersici, Verticillium albo-atrum,* and *Pythium sp.,* when applied to the soil in a concentration of 0.05%. It also exhibits herbicidal activity when applied to grass, beans and broad-leaf plants as a spray composition containing 0.5% by weight of the sodium diethoxyphosphinyl thioformate. S-methyl diethoxyphosphinyl thioformate exhibits herbicidal activity when applied as a spray composition containing 0.5% of the chemical to grass and broad-leaf plants, without exhibiting any activity on bean plants. S-methyl diethoxyphosphinyl thioformate is also toxic to the mobile and resting stages and eggs of two-spotted spider mites when applied at a concentration of 0.1% to mite-infested plants.

Reasonable variation and modification of the invention as described are possible, the essence of which is that there have been provided alkali metal and alkyl derivatives of dihydrocarbylphosphinyl thioformic acids as new compounds and methods for preparing said new compounds.

We claim:

1. An organic phosphorus compound of the formula

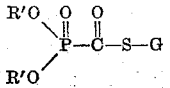

wherein R′ is an hydrocarbyl radical substantially free of acetylenic unsaturation containing from 1 to 12 carbon atoms and selected from the group consisting of alkyl, aryl, alkaryl and aralkyl radicals and G is selected from the group consisting of alkali metal and alkyl radicals of from 1 to 8 carbon atoms.

2. An organic phosphorus compound of the formula

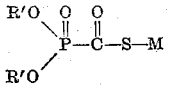

wherein R′ is an hydrocarbyl radical substantially free of acetylenic unsaturation containing from 1 to 12 carbon atoms and selected from the group consisting of alkyl, aryl, alkaryl, and aralkyl radicals and M is an alkali metal selected from the group consisting of sodium, potassium and lithium.

3. An organic phosphorus compound of the formula

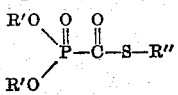

wherein R′ is an hydrocarbyl radical substantially free of acetylenic unsaturation containing from 1 to 12 carbon atoms selected from the group consisting of alkyl, aryl, alkaryl and aralkyl radicals and R″ is an alkyl radical of from 1 to 8 carbon atoms.

4. Sodium diethoxyphosphinyl thioformate.

5. S-methyl diethoxyphosphinyl thioformate.

6. The method which comprises reacting an alkali metal hydrocarbylphosphite diester, said hydrocarbyl radical being substantially free of acetylenic unsaturation and containing from 1 to 12 carbon atoms selected from the group consisting of alkyl, aryl, alkaryl, and aralkyl radicals, with carbonyl sulfide and recovering alkali metal dihydrocarbyloxyphosphinyl thioformate as product of the process.

7. The method which comprises reacting an alkali metal dihydrocarbyloxyphosphinyl thioformate said hydrocarbyl radical being substantially free of acetylenic unsaturation and containing from 1 to 12 carbon atoms selected from the group consisting of alkyl, aryl, alkaryl, and aralkyl radicals, with a compound selected from the group consisting of alkyl sulfates, alkyl sulfonates and alkyl halides and recovering from the reaction mixture S-alkyl dihydrocarbyloxyphosphinyl thioformate as product of the process.

8. The method which comprises reacting an alkyl metal hydrocarbylphosphite diester of the formula

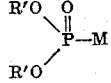

wherein R′ is an hydrocarbyl radical substantially free of acetylenic unsaturation containing from 1 to 12 carbon atoms and selected from the group consisting of alkyl, aryl, alkaryl, and aralkyl radicals and M is an alkali metal selected from the group consisting of sodium, potassium and lithium with carbonyl sulfide to form an organic phosphorus compound of the formula

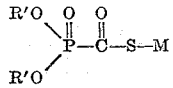

wherein R' and M are as above defined, and then reacting said last formed compound with a compound of the formula R"Y wherein R" is an alkyl radical of from 1 to 8 carbon atoms and Y is selected from the group consisting of

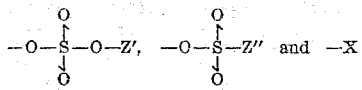

wherein Z' is an alkyl radical of from 1 to 8 carbon atoms, Z" is selected from a group consisting of alkyl, aryl, alkaryl, aralkyl, haloalkyl and haloaryl radicals, and X is a halogen selected from the group consisting of chlorine, bromine and iodine and recovering from the last resulting reaction mixture an organic phosphorus compound of the formula

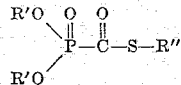

wherein R' and R" are as above defined.

9. The method which comprises reacting an alkali metal hydrocarbylphosphite diester of the formula

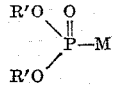

wherein R' is an hydrocarbyl radical substantially free of acetylenic unsaturation containing from 1 to 12 carbon atoms and selected from the group consisting of alkyl, aryl, alkaryl and aralkyl radicals and M is an alkali metal selected from the group consisting of sodium, potassium and lithium with carbonyl sulfide and recovering from the resulting reaction mixture an organic phosphorus compound of the formula

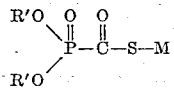

wherein R' and M are as above defined.

10. The method which comprises reacting an organic phosphorus compound of the formula

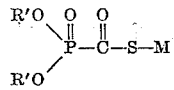

wherein R' is an hydrocarbyl radical substantially free of acetylenic unsaturation containing from 1 to 12 carbon atoms and selected from the group consisting of alkyl, aryl, alkaryl, and aralkyl radicals and M is an alkali metal selected from the group consisting of sodium, potassium and lithium with a compound of the formula R"Y wherein R" is an alkyl radical of from 1 to 8 carbon atoms and Y is selected from the group consisting of

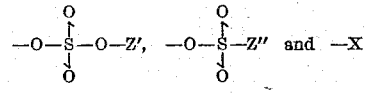

wherein Z' is an alkyl radical of from 1 to 8 carbon atoms, Z" is selected from the group consisting of alkyl, aryl, alkaryl, or aralkyl, haloalkyl and haloaryl radicals, and X is a halogen selected from the group consisting of bromine, chlorine and iodine, and recovering from the resulting reaction mixture an organic phosphorus compound of the formula

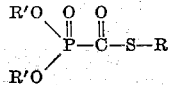

wherein R' and R" are as above defined.

11. The method of claim 8 wherein said carbonyl sulfide is introduced as a gas into an inert solvent containing said alkali metal hydrocarbylphosphite diester to carry out said reaction.

12. The method of claim 8 wherein said carbonyl sulfide is contacted as a condensed liquid with an inert solvent containing said alkali metal hydrocarbylphosphite diester to carry out said reaction.

13. The method of claim 8 wherein said compound of the formula R"Y and said organic phosphorus compound of the formula

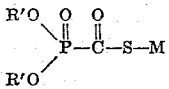

are reacted suspended in inert solvents.

14. The method of claim 8 wherein said alkali metal hydrocarbylphosphite diester is prepared by reacting an hydrocarbylhydrogen phosphite suspended in an inert solvent with sodium hydride.

15. The method which comprises reacting sodium diethyl phosphite with carbonyl sulfide to form the sodium diethoxyphosphinyl thioformate and then reacting said thioformate wtih dimethyl sulfate and recovering S-methyl diethoxyphosphinyl thioformate as product of the process.

16. The method which comprises reacting sodium diethyl phosphite with carbonyl sulfide and recovering sodium diethoxyphosphinyl thioformate as product of the process.

17. The method which comprises reacting sodium diethoxyphosphinyl thioformate with dimethyl sulfate and recovering S-methyl diethoxyphosphinyl thioformate as product of the process.

References Cited in the file of this patent
UNITED STATES PATENTS 2,629,731    Harman _____ Feb. 24, 1953